United States Patent
Kim et al.

(10) Patent No.: US 11,346,014 B2
(45) Date of Patent: May 31, 2022

(54) ELECTROLYTIC COPPER FOIL, METHOD FOR PRODUCING SAME, AND HIGH-CAPACITY LI SECONDARY BATTERY NEGATIVE ELECTRODE INCLUDING SAME

(71) Applicant: KCF Technologies Co., Ltd., Anyang-si (KR)

(72) Inventors: Seung Min Kim, Anyang-si (KR); Ho Gun Kim, Anyang-si (KR)

(73) Assignee: SK NEXILIS CO., LTD., Jeongeup-si (KR)

( * ) Notice: Subject to any disclaimer, the term of this patent is extended or adjusted under 35 U.S.C. 154(b) by 218 days.

(21) Appl. No.: 16/643,758

(22) PCT Filed: Aug. 24, 2018

(86) PCT No.: PCT/KR2018/009801
§ 371 (c)(1),
(2) Date: Mar. 31, 2020

(87) PCT Pub. No.: WO2019/045374
PCT Pub. Date: Mar. 7, 2019

(65) Prior Publication Data
US 2020/0277705 A1   Sep. 3, 2020

(30) Foreign Application Priority Data

Sep. 1, 2017   (KR) .......................... 10-2017-0111735

(51) Int. Cl.
*H01M 4/02* (2006.01)
*C25D 1/04* (2006.01)
(Continued)

(52) U.S. Cl.
CPC ................. *C25D 1/04* (2013.01); *C25D 3/38* (2013.01); *C25D 5/48* (2013.01); *H01M 4/02* (2013.01);
(Continued)

(58) Field of Classification Search
CPC ...................................................... H01M 4/02
See application file for complete search history.

(56) References Cited

FOREIGN PATENT DOCUMENTS

| EP | 3288101 A1 | 2/2018 |
|---|---|---|
| JP | 2005530926 A | 10/2005 |

(Continued)

OTHER PUBLICATIONS

Extended European Search Report for related European Application No. 18851879.9; action dated Apr. 16, 2021; (10 pages).

(Continued)

*Primary Examiner* — Jacob B Marks
(74) *Attorney, Agent, or Firm* — K&L Gates LLP (57) ABSTRACT

The present invention relates to an electrolytic copper foil current collector where the surface properties are controlled to achieve a high adhesiveness to a negative electrode material. An electrolytic copper foil has a first surface and the second surface, the electrolytic copper foil comprising a first protective layer on the first surface side, a second protective layer on the second surface side, and a copper film between the first and second protective layers, wherein the coupling coefficient at the first surface or second surface of the electrolytic copper foil is 1.5 to 9.4 as represented by coupling coefficient=Rp/μm+ peak density/30+ amount of Cr adhesion/(mg/m²) (here, peak density is measured according to ASME standard B46.1). The electrolytic copper foil has a high adhesiveness to a negative electrode material and a low electrical resistance can be provided by controlling the surface properties of the electrolytic copper foil surface.

8 Claims, 2 Drawing Sheets

(51) Int. Cl.
*C25D 3/38* (2006.01)
*C25D 5/48* (2006.01)
*H01M 4/66* (2006.01)
*H01M 4/70* (2006.01)

(52) U.S. Cl.
CPC ........... *H01M 4/661* (2013.01); *H01M 4/667* (2013.01); *H01M 4/70* (2013.01); *H01M 2004/027* (2013.01)

(56) References Cited

FOREIGN PATENT DOCUMENTS

| | | |
|---|---|---|
| JP | 2011195893 A | 10/2011 |
| JP | 2013175488 A | 9/2013 |
| KR | 20170000761 A | 1/2017 |
| KR | 20170012010 A | 2/2017 |
| KR | 2017-0053888 * | 5/2017 |
| KR | 101733408 B1 | 5/2017 |
| KR | 101733410 B1 | 5/2017 |
| KR | 20170053888 A | 5/2017 |
| KR | 20180022208 A | 3/2018 |
| KR | 20180054985 A | 5/2018 |
| KR | 20180083515 A | 7/2018 |
| WO | 2016208858 A1 | 12/2016 |

OTHER PUBLICATIONS

International Search Report for related International Application No. PCT/KR2018/009801 report dated Mar. 8, 2019; (7 pages).
Written Opinion for related International Application No. PCT/KR2018/009801 report dated Mar. 8, 2019; (6 pages).
Korean Office Action for related Korean Application No. 10-2017-0111735;action dated Mar. 9, 2022; (9 pages).

* cited by examiner

ELECTROLYTIC COPPER FOIL, METHOD FOR PRODUCING SAME, AND HIGH-CAPACITY LI SECONDARY BATTERY NEGATIVE ELECTRODE INCLUDING SAME

CROSS-REFERENCE TO RELATED APPLICATIONS

The present application is a National Stage of International Application No. PCT/KR2018/009801, filed Aug. 24, 2018, which claims priority to Korean Application No. 10-2017-0111735, filed on Sep. 1, 2017, the disclosure of which are incorporated herein by reference.

FIELD OF THE INVENTION

The present disclosure relates to a copper foil current collector, and more particularly to an electrolytic copper foil that has high force of adhesion with a negative electrode active material of an Li secondary battery.

BACKGROUND OF THE INVENTION

With an increase in use of portable electronic devices, such as mobile phones and laptop computers, and the population of hybrid vehicles, the demand for Li batteries has abruptly increased.

For a lithium secondary battery, a negative electrode current collector is mainly made of an electrolytic copper foil. The electrolytic copper foil is manufactured through a foil making process using an electroplating method, wherein a shiny surface, which has relatively low roughness, is formed on one surface of the manufactured electrolytic copper foil and a matte surface, which has relatively high roughness, is formed on the other surface thereof. The matte surface of the electrolytic copper foil is coated with an active material, such as a carbon-based slurry.

In the lithium secondary battery, force of binding between the current collector and the active material is changed depending on the state of the surface of the electrolytic copper foil, which is used as the current collector, whereby the capacity and yield of the battery are determined. Particular, in the case in which the force of binding between the current collector and the active material is low, the active material is separated from the current collector during the lifespan of the secondary battery, whereby internal short circuit may occur.

At the present time, a graphite-based material is mainly used as a negative electrode material for lithium ion secondary batteries, and an active material having a small amount of S1 added thereto has been applied in order to achieve high capacity in recent years. Conventionally, it is reported that it is possible to increase force of adhesion between the copper foil and the negative electrode through control of surface roughness, such as Rz. In many actual cases, however, force of adhesion between the copper foil and the negative electrode material in the Li secondary battery does not reach required performance even though roughness control is performed. In particular, such a phenomenon is remarkable in the case of an active material having Si partially mixed therewith for high capacity.

BRIEF DESCRIPTION OF THE INVENTION

The present invention has been made in view of the above problems, and it is an object of the present disclosure to provide an electrolytic copper foil that has force of adhesion with a negative electrode material by controlling the surface properties of the copper foil.

It is another object of the present disclosure to provide an electrolytic copper foil current collector that has high force of adhesion with a negative electrode material and exhibits low electrical resistance.

It is a further object of the present disclosure to provide a negative electrode for Li secondary batteries including the electrolytic copper foil current collector, wherein the negative electrode exhibits a high discharge capacity retention rate, and a Li secondary battery including the same.

In accordance with an aspect of the present disclosure, the above and other objects can be accomplished by the provision of an electrolytic copper foil having a first surface and a second surface, the electrolytic copper foil including a first protective layer at the first surface side, a second protective layer at the second surface side, and a copper film disposed between the first and second protective layers, wherein the binding coefficient of the electrolytic copper foil at the first surface or the second surface, defined as Mathematical Expression 1 below, is 1.5 to 9.4.

Mathematical Expression 1

Binding coefficient=$Rp/\mu m$+ peak density/30+ amount of attachment of $Cr/(mg/m^2)$ (where the peak density is a value measured according to ASME B46.1 standards)

In addition, an X-ray diffraction pattern of the copper film measured at the first surface or the second surface may have a texture coefficient of a (220) plane, defined by Mathematical Expression 2 below, of 0.49 to 1.28.

$$TC(220) = \frac{\frac{I(220)}{I_0(220)}}{\frac{1}{n}\sum \frac{I(hkl)}{I_0(hkl)}} \qquad \text{(Mathematical Expression 2)}$$

A weight deviation in lateral direction of the electrolytic copper foil may be less than 3%. In addition, the electrolytic copper foil may have a yield strength of 21 to 49 $kgf/mm^2$ measured at a normal temperature.

In accordance with an aspect of the present disclosure, there is provided a method of manufacturing an electrolytic copper foil, the method including electroplating a copper film on the rotary negative electrode drum by applying current between a positive electrode plate and a rotary negative electrode drum disposed in an electrolytic solution contained in an electrolytic bath so as to be spaced apart from each other, winding the electroplated copper film, and immersing the copper film in an anti-corrosion solution for anti-corrosion treatment, wherein, when the electroplating is performed, a concentration of total carbon is maintained at 0.12 g/L or less and a concentration of $Co^{2+}$ is maintained at 0.33 g/L or less. The concentration of a nitrogen compound in the electrolytic solution may preferably be 12 ppm or less.

In addition, the nitrogen compound may be DETA, and the concentration of the DETA may preferably be 3.2 to 12 ppm.

In accordance with a further aspect of the present disclosure, there is provided a negative electrode for Li secondary batteries, the negative electrode including an electrolytic copper foil current collector having a first surface and a second surface, and negative electrode active material layers on the first surface and the second surface, wherein the electrolytic copper foil includes a first protective layer at the first surface side, a second protective layer at the second surface side, and a copper film disposed between the first and second protective layers, and the binding coefficient of the electrolytic copper foil at the first surface or the second surface, defined as Mathematical Expression 3 below, is 1.5 to 9.4.

Mathematical Expression 3

Binding coefficient=Rp/μm+ peak density/30+ amount of attachment of Cr/(mg/m$^2$)

where the peak density is a value measured according to ASME B46.1 standards.

According to the present disclosure, it is possible to provide an electrolytic copper foil that has force of adhesion with a negative electrode material by controlling the surface properties of the copper foil and exhibits low electrical resistance.

In addition, according to the present disclosure, it is possible to provide a negative electrode for Li secondary batteries that exhibits a high discharge capacity retention rate and a Li secondary battery including the same.

DETAILED DESCRIPTION OF THE INVENTION

Hereinafter, a preferred embodiment of the present disclosure will be described with reference to the accompanying drawings.

Figure 1:
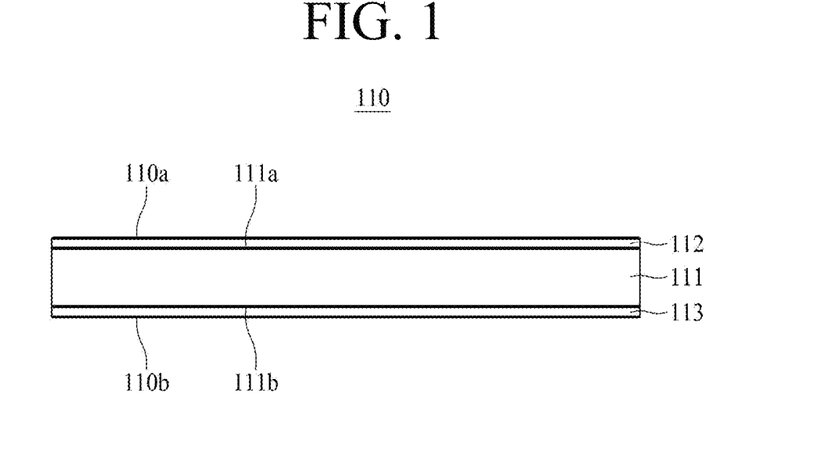
FIG. 1 is a schematic view showing the sectional structure of an electrolytic copper foil according to an embodiment of the present disclosure.

FIG. 1 is a schematic view showing the sectional structure of an electrolytic copper foil according to an embodiment of the present disclosure.

Referring to FIG. 1, the electrolytic copper foil 110 has a first surface 100a and a second surface 110b, and includes a first protective layer 112 forming the first surface 100a, a second protective layer 113 forming the second surface 110b, and a copper film 111 disposed between the first and second protective layers 112 and 113.

In the present disclosure, the electrolytic copper foil 110 has a predetermined thickness, e.g. a thickness of 4 to 30 μm. In the case in which the thickness of the copper foil is less than 4 μm, workability is deteriorated in a battery manufacturing process. In the case in which the thickness of the copper foil is greater than 30 μm, it is difficult to realize high capacity at the time of manufacturing an Li secondary battery due to the large thickness of the copper foil.

The copper film 111 is formed on a rotary negative electrode drum by electroplating, and has a shiny surface (an S surface) 111a, which directly contacts the rotary negative electrode drum during an electroplating process, and a matte surface (an M surface) 111b, which is opposite the shiny surface.

Preferably, each of the first and second protective layers 112 and 113 includes an anticorrosive coating layer. The anticorrosive coating layer includes a chromate compound. The first and second protective layers 112 and 113 prevent oxidization and corrosion of the copper film 111, and improve adhesiveness of an active material. In addition, the anticorrosive coating layer may further include a silane compound and/or a nitrogen compound.

In the present disclosure, the electrolytic copper foil 110 has a controlled surface-shape-related factor. In the present disclosure, the surface-shape-related factor includes a surface-roughness-related factor, and examples of the surface-roughness-related factor that are preferably considered are a peak height Rp and peak density. In general, force of adhesion between a negative electrode material and a copper foil is related to surface roughness, and it is considered that adhesion force of the negative electrode material increases as surface roughness increases. In the case in which a peak is too high and irregularities of a surface are excessive, however, binding of the negative electrode material may be deteriorated. In the present disclosure, therefore, the surface-roughness-related factor is expressed as the sum of the peak height Rp and the peak density, and may be maintained within an appropriate range in order to obtain adhesion force.

Also, in the present disclosure, the surface properties of the electrolytic copper foil 110 are designed in consideration of a chemical factor. In the present disclosure, the electrolytic copper foil 110 has a controlled number of active sites on the surface thereof. Preferably, in the present disclosure, the number of active sites is calculated as the amount of Cr attached to the surface thereof. In general, it may be considered that the force of adhesion between the negative electrode material and the copper foil is proportional to the amount of attachment of Cr. In the case in which the amount of attachment of Cr is excessive, however, affinity between the copper foil and the negative electrode material may be deteriorated.

In the present disclosure, a weight based on an empirical equation is given among the peak height Rp and the peak density, which are surface-roughness-related factors that affect binding force of the negative electrode material, and the amount of attachment of Cr. Preferably, the electrolytic copper foil 110 of the present disclosure is controlled such that a binding coefficient (BC) defined as Mathematical Expression 1 below has a specific value.

Mathematical Expression 1

Binding coefficient (BC)=Rp/μm+ peak density/30+ amount of Cr attached to surface/(mg/m$^2$)

In Mathematical Expression 1, Rp is measured according to JIS B 0601 (2001) standards. At this time, a measurement length excluding a cutoff length was 4 mm, and the cutoff length was 0.8 mm at the early stage and at the late stage. Rp was measured using an SJ-310 surface roughness tester from Mitutoyo, wherein the radius of a stylus tip was 2 μm, and measurement pressure was 0.75 mN. The average of values measured three times was taken as Rp.

Meanwhile, peak density is measured according to ASME B46.1 standards, and a peak count level is set to ±0.5 μm based on the center line of a profile. The peak density may be measured using an illuminometer (Marsurf M300 from Mahr). At this time, a measurement length excluding a cutoff length was 4 mm, and the cutoff length was 0.8 mm at the early stage and at the late stage. The radius of a stylus tip was 2 μm, and measurement pressure was 0.75 mN. The average of values measured three times was taken as the peak density.

In addition, the amount of attachment of Cr in Mathematical Expression 1 may be measured as follows. The surface opposite to the surface of an electrolytic copper foil to be measured is masked with tape, a sample is cut to a size of 10 mm*10 mm, the surface of the sample to be measured is dissolved in a nitric acid solution (commercial nitric acid and water being mixed at a ratio of 1:1 and the temperature of the nitric acid solution being 70° C.) such that no hole is formed through the copper foil by the nitric acid, and the dissolved solution is diluted with water until the amount of the dissolved solution is 50 mL (temperature of the solution being 25±3° C.). The diluted solution is analyzed using an atomic absorption spectrometer (AAS) at a temperature of 25±3° C. The opposite surface may be analyzed using the same method. The average of values measured three times is taken as the amount of attachment of Cr.

In the present disclosure, in the case in which the binding coefficient (BC) is less than 1.5, the number of active sites of the copper foil capable of contacting a negative electrode slurry is too small, whereby adhesion force is reduced. In the case in which the binding coefficient exceeds 9.4, affinity between the negative electrode slurry and the copper foil is deteriorated, and irregularities of the surface are excessive, whereby the surface of the copper foil is not uniformly coated with a negative electrode agent contained in the negative electrode slurry and thus force of adhesion between the copper foil and the negative electrode agent is greatly reduced.

Meanwhile, in the present disclosure, the electrolytic copper foil preferably has a crystalline structure configured such that a texture coefficient of a (220) plane is within a specific range. In the present disclosure, the texture coefficient (TC) of the (220) plane is expressed by Mathematical Expression 2 below.

$$TC(220) = \frac{\frac{I(220)}{I_0(220)}}{\frac{1}{n}\sum \frac{I(hkl)}{I_0(hkl)}}$$ (Mathematical Expression 2)

In Mathematical Expression 2 above, I(hkl) means the XRD diffraction strength of an (hkl) crystal plane of a sample, and I0(hkl) means the diffraction strength of an (hkl) crystal plane of standard copper powder prescribed by the Joint Committee on Powder Diffraction Standards (JCPDS) (an X-ray source: Cu $K_{\alpha 1}$). Also, in Mathematical Expression 2, n indicates the number of diffraction peaks within a specific range of diffraction angles (2θ). In the present disclosure, the texture coefficient is acquired from an X-ray diffraction pattern within a range of diffraction angles from 30° to 95°, and remarkable crystal planes that are considered are (111), (200), (220), and (311) planes. That is, the texture coefficient of the (220) plane indicates a ratio of the normalized peak strength of the (220) plane to the average peak strength of the (111), (200), (220), and (311) planes normalized as the peak strength of standard Cu in the X-ray diffraction pattern of the sample.

In the present disclosure, the texture coefficient is preferably within a range of 0.49 to 1.28. In the case in which the texture coefficient of the (220) plane is less than 0.49, as will be described below, the number of active sites of a crystal texture of the copper foil is insufficient, whereby it is difficult to uniformly coat the negative electrode material. Also, in the case in which the texture coefficient of the (220) plane exceeds 1.28, the texture of the copper foil is too dense, whereby it is difficult for the negative electrode material to be physically bonded to the surface of the copper foil and thus force of adhesion between the negative electrode material and the copper foil is reduced.

In addition, the weight deviation in lateral direction of the electrolytic copper foil of the present disclosure is preferably less than 3%.

In the case in which the weight deviation in lateral direction is 3% or more, coating is nonuniformly performed at the time of coating the copper foil with the negative electrode material, and the copper foil is thinly coated with the negative electrode material in an area having small weight at the point at which the weight deviation of the copper foil is great, whereby a separation phenomenon may easily occur.

In the present disclosure, the texture coefficient and the weight deviation in lateral direction individually affect adhesion force, whereas the surface-shape-related factor and ingredient-related factor of the copper foil affect adhesion force in a combined state.

In the present disclosure, the weight deviation in lateral direction of the electrolytic copper foil is calculated by cutting the copper foil to an area of 5 cm×5 cm to make a sample, measuring the weight of the sample and converting the measured weight into a weight value of the copper foil per unit area, repeatedly performing the sample cutting process in the lateral direction of the copper foil, measuring weight values of the copper foil of respective samples, and calculating a standard deviation.

Also, in the present disclosure, the electrolytic copper foil is preferably an electrolytic copper foil having a yield strength of 21 to 49 kgf/mm$^2$ measured at a normal temperature (25±15° C.). In the case in which the yield strength of the copper foil is less than 21 kgf/mm$^2$, the copper foil may easily wrinkle due to the force applied to the copper foil during the manufacturing process. Also, in the case in which the yield strength of the copper foil exceeds 49 kgf/mm$^2$, workability may be deteriorated in an Li secondary battery manufacturing process. The yield strength of a sample may be measured using a universal testing machine (UTM) according to methods defined in the IPC-TM-650 Test Method Manual. In an embodiment of the present disclosure, the yield strength of a sample is measured using a universal testing machine from Instron Company. The width of a sample for measurement is 12.7 mm, the distance between grips is 50 mm, and the measurement speed is 50 mm/min. For evaluation, the yield strength of the sample may be repeatedly measured three times, and the average thereof may be taken as the yield strength of the copper foil 100.

Optionally, in the present disclosure, each of the first and second protective layers 112 and 113 may further include a roughening treatment layer. The roughening treatment layer is formed by plating one of copper, cobalt, and nickel, or by plating an alloy of two or more thereof, and may be interposed between the anticorrosive coating layer and the copper film.

Figure 2:
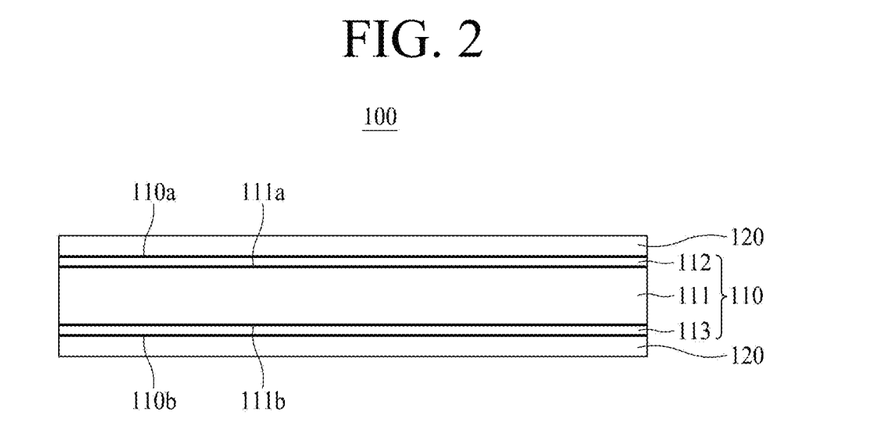
FIG. 2 is a schematic view showing the sectional structure of a negative electrode for Li secondary batteries according to an embodiment of the present disclosure.

FIG. 2 is a schematic view showing the sectional structure of a negative electrode for Li secondary batteries according to an embodiment of the present disclosure.

Referring to FIG. 2, an electrolytic copper foil 110 has a first surface 100a and a second surface 110b, and includes a first protective layer 112 forming the first surface 100a, a second protective layer 113 forming the second surface 110b, and a copper film 111 disposed between the first and second protective layers 112 and 113, in the same manner as the description given with reference to FIG. 1.

A negative electrode active material layer 120 is provided on each of the first and second protective layers 112 and 113.

The negative electrode active material layer 120 may include a carbon-based active material, such as graphite or coke. In addition, the active material of the negative electrode active material layer 120 may include at least one metal selected from the group consisting of Si, Ge, Sn, Li, Zn, Mg, Cd, Ce, Ni, and Fe, an alloy including the metal, or a compound of the metal. In addition, the active material of the negative electrode active material layer 120 may be a composite of the metal and carbon. In addition, the negative electrode active material layer 120 may further include a conductive agent and a binder.

Figure 3:
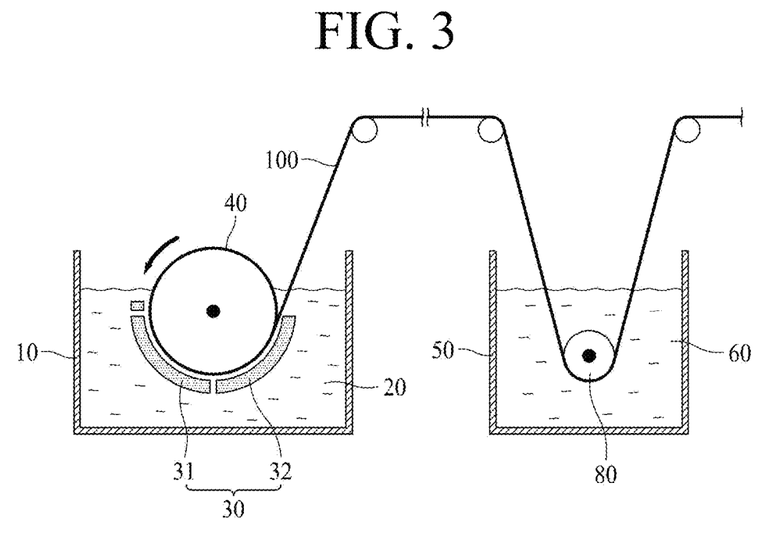
FIG. 3 is a view schematically showing an electrolytic copper foil manufacturing apparatus of the present disclosure.

FIG. 3 is a view schematically showing an electrolytic copper foil manufacturing apparatus of the present disclosure.

The electrolytic copper foil manufacturing apparatus of FIG. 3 is used in a series of roll-to-roll processes connected to a foil manufacturing step and an anti-corrosion step.

As shown in FIG. 3, a positive electrode plate 30 and a rotary negative electrode drum 40 are provided in an electrolytic solution 20 contained in an electrolytic bath 10 so as to be spaced apart from each other. In the case in which power is applied between the negative electrode drum 40 and the positive electrode plate 30 while the rotary negative electrode drum 40 is rotated in a predetermined direction, plating is performed through electric conduction via the electrolytic solution 20. A copper film 100 plated on the surface of the negative electrode drum 40 is wound along a guide roll 80.

A copper sulfate plating solution, a copper pyrophosphate plating solution, or a copper sulfamate plating solution may be used as the electrolytic solution for depositing the electrolytic copper foil. Preferably, in the present disclosure, a copper sulfate plating solution is very suitable as the electrolytic solution.

At this time, the positive electrode plate 30 may include a first positive electrode plate 31 and a second positive electrode plate 32, which are electrically insulated from each other. At this time, it can be seen that the density of current supplied by the positive electrode plate 30, i.e. the first positive electrode plate 31 and the second positive electrode plate 32, may be 40 to 80 A/dm$^2$. The higher the current density, the more uniformly the surface of the positive electrode plate is plated, whereby the average peak height Rp of the copper foil is reduced. In the case in which the density of current exceeds 80 A/dm$^2$, the peak height Rp deviates from the required lower limit. In the case in which the density of current is less than 40 A/dm$^2$, on the other hand, rough plating is performed, whereby the peak height Rp deviates from the required upper limit.

In an embodiment of the present disclosure, the electrolytic solution 20 includes 70 to 90 g/L of copper ions, 80 to 120 g/L of sulfuric acid, 50 ppm or less of chloride ions, and an organic additive. The organic additive may be gelatin, hydroxyethyl cellulose (HEC), an organic sulfide, an organic nitride, a thiourea-based compound, or a mixture of two or more thereof. Also, in the present disclosure, in order to maintain purity of the electrolytic solution, it is necessary to remove foreign matter from a copper wire, to clean the copper wire, and to introduce the copper wire into sulfuric acid. Also, in order to maintain cleanliness of the electrolytic solution, it is necessary to introduce hydrogen peroxide and air into the electrolytic solution.

In the case in which the concentration of TC in the plating solution is high, plating is nonuniformly performed, and the peak height Rp and the peak density increase. Meanwhile, in the case in which the concentration of $Co^{2+}$ in the electrolytic solution is increased, the reducing speed of $Cu^{2+}$ ions may be increased at the time of plating, whereby uniform plating may be performed, and the peak height Rp and the peak density decrease. In the present disclosure, the content of TC and $Co^{2+}$ is adjusted to control the peak height Rp and the peak density. Preferably, the content of total carbon TC in the electrolytic solution must be maintained at 0.12 g/L or less, and the concentration of $Co^{2+}$ must be maintained at 0.33 g/L or less. In the case in which the content of TC exceeds 0.12 g/L and the concentration of $Co^{2+}$ exceeds 0.33 g/L, the peak height Rp and the peak density increase in a portion of the copper foil, and the peak height Rp and the peak density decrease in another portion of the copper foil. As a result, a copper foil having great local quality deviation is manufactured, and it is not appropriate to use such a copper foil as a negative electrode current collector.

The texture and the yield strength of the copper foil may be controlled by the kind and concentration of an additive added to the electrolytic solution.

Specifically, the content of a nitride in the electrolytic solution may be adjusted to control the yield strength and adhesion force of the copper foil. In the present disclosure, at least one nitride selected from the group consisting of diethylenetriamine (DETA), thiourea, gelatin, collagen, glycine, glycogen, polyacrylamide, and propyl amide may be used as a preferred nitride. For example, a range of appropriate concentration of DETA as an additive is 3.2 to 12.0 ppm. In the case in which the concentration of DETA is less than 3.2 ppm, it is difficult to realize the yield strength of the copper foil. In the case in which the concentration of DETA exceeds 12 ppm, the yield strength of the copper foil exceeds a required level.

Also, in the case in which the concentration of a nitride-based compound in the plating solution exceeds 12 ppm, micro-scale plating is performed, and the texture of the (220) plane develops. In the case in which the concentration of the nitride-based compound in the plating solution is less than 3 ppm, on the other hand, the size of a plated grain is large, the texture of the (111) plane develops, and the texture of the (220) plane is relatively inhibited.

In the present disclosure, the electrolytic solution 20 is preferably maintained at 50 to 60° C., and the flow rate of the electrolytic solution 20 that is supplied into the electrolytic bath 10 is preferably maintained at 35 to 46 m$^3$/hour. In the case in which the flow rate of the electrolytic solution 20 is less than 35 m$^3$/hour, copper ions are not sufficiently supplied to the surface of the rotary negative electrode drum 40, whereby a plated thin foil is nonuniformly formed. In the case in which the flow rate of the electrolytic solution 20 exceeds 46 m$^3$/hour, the flow speed of the electrolytic solution 20 that passes through a filter is too high whereby the lifespan of the filter is abruptly shortened.

In the foil making process of the present disclosure, deviation in flow speed must be maintained within 10%. In the case in which deviation in flow speed is 10% or more, solution resistance is low at the portion at which flow speed is high, whereby the amount of plating of Cu increases, and solution resistance is high at the portion at which flow speed is low, whereby the amount of plating of Cu relatively decreases. As a result, the weight deviation in lateral direction of the finally plated copper foil exceeds 3%.

The copper film manufactured through plating is introduced into an anti-corrosion bath 50 along the guide roll 80.

In the present disclosure, an anti-corrosion solution 60 includes chromate. A mixture of dichromate, such as $M_2Cr_2O_7$ (where M is a 1-valent metal), or chromic acid, such as $CrO_3$, alkali hydroxide, and acid may be used as chromate. In addition, the treatment solution may further include zinc salt, such as ZnO or $ZnSO_4 \cdot 7H_2O$. In addition, the anti-corrosion solution 60 may further include a silane compound and/or a nitrogen compound.

In the present disclosure, the concentration of Cr in the anti-corrosion solution is maintained at 0.5 to 1.5 g/L. In the case in which the concentration of Cr is less than 0.5 g/L, the amount of Cr that is electro-deposited on the surface of the copper foil abruptly decreases. In the case in which the concentration of Cr exceeds 1.5 g/L, the amount of Cr that is electro-deposited on the surface of the copper foil abruptly increases.

Hereinafter, a preferred embodiment of the present disclosure will be described in detail.

Manufacture of Electrolytic Copper Foil

A positive electrode plate and a rotary negative electrode drum, disposed in an electrolytic solution contained in an electrolytic bath so as to be spaced apart from each other, were electrically conducted to form a copper film on the rotary negative electrode drum using an apparatus as shown in FIG. 3.

The electrolytic solution included 75 g/L of copper ions and 100 g/L of sulfuric acid. DETA, an organic sulfide, and an organic nitride were used as an organic additive. The content of TC, Co, and DETA in the electrolytic solution was changed to manufacture copper films under different conditions. The electrolytic solution was maintained at about 55° C., current density was 45 A/dm², flow rate was 37 m³/hr, and experiments were carried out while deviation in flow speed was changed.

Subsequently, a chromium oxide solution having citric acid added thereto was used as an anti-corrosion solution, and the surface of the manufactured copper film was treated while the concentration of Cr was changed.

The copper film was immersed at a normal temperature (30° C.) for 1 to 3 seconds. Subsequently, the chromium oxide solution was dried to form anticorrosive coating layers on opposite surfaces of the copper film, whereby an electrolytic copper foil having a thickness of 6 µm was manufactured.

The foil making and anti-corrosion conditions of the manufactured copper foil are shown in Table 1 below.

TABLE 1

| | TC g/L | Concentration of $Co^{2+}$ g/L | Concentration of Cr in anti-corrosion solution g/L | DETA mg/L | Lateral deviation in flow speed % |
|---|---|---|---|---|---|
| Example 1 | 0.05 | 0.32 | 0.5 | 7.5 | 5.2 |
| Example 2 | 0.11 | 0.16 | 1.5 | 7.5 | 5.3 |
| Example 3 | 0.05 | 0.16 | 1.0 | 3.2 | 4.8 |
| Example 4 | 0.05 | 0.16 | 1.0 | 12 | 5.5 |
| Example 5 | 0.05 | 0.16 | 1.0 | 7.5 | 9.8 |
| Comparative Example 1 | 0.05 | 0.34 | 0.4 | 7.5 | 4.8 |
| Comparative Example 2 | 0.13 | 0.16 | 1.6 | 7.5 | 5.0 |
| Comparative Example 3 | 0.05 | 0.16 | 1.0 | 2.9 | 5.2 |
| Comparative Example 4 | 0.05 | 0.16 | 1.0 | 12.1 | 5.3 |
| Comparative Example 5 | 0.05 | 0.16 | 1.0 | 7.5 | 11.2 |

Subsequently, properties of samples of the manufactured electrolytic copper foil (Examples 1 to 5 and Comparative Examples 1 to 5) were measured. A measurement method is as follows.

Binding Coefficient (BC)

An SJ-310 surface roughness tester from Mitutoyo and a stylus tip having a radius of 2 µm were used, measurement pressure was 0.75 mN, and Rp was measured according to JIS B 0601 (2001) standards. At this time, a measurement length excluding a cutoff length was 4 mm, and the cutoff length was 0.8 mm at the early stage and at the late stage. The average of values measured three times was taken as Rp.

Peak density (PD) was measured according to ASME B46.1 standards, wherein the peak density was measured using an illuminometer (Marsurf M300 from Mahr) and a stylus tip having a radius of 2 µm. A peak count level was set to ±0.5 µm based on the center line of a profile, a measurement length excluding a cutoff length was 4 mm, and the cutoff length was 0.8 mm at the early stage and at the late stage. Measurement pressure was 0.75 mN. The average of values measured three times was taken as the peak density.

Figure 4:
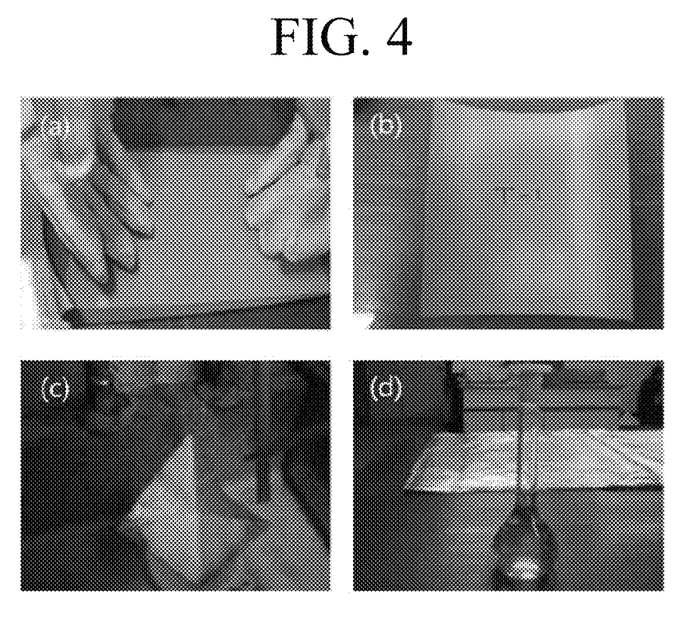
FIG. 4 is a series of photographs sequentially showing a process of measuring the amount of attachment of CR in an embodiment of the present disclosure.

Cr attached to the surface of the copper foil was dissolved, and the amount of attachment of Cr was analyzed using an atomic absorption spectrometer (AAS) through a process as shown in FIG. 4. First, the surface opposite to the surface (the M surface) of a manufactured sample to be measured was masked with a tape (FIG. 4(a)), the sample was cut to a size of 10 mm*10 mm (FIG. 4(b)), the surface of the sample to be measured was dissolved in a nitric acid solution (commercial nitric acid and water being mixed in a ratio of 1:1 and the temperature of the nitric acid solution being 70° C.) such that no hole was formed through the copper foil by the nitric acid (FIG. 4(c)), and the dissolved solution was diluted with water until the amount of the dissolved solution was 50 mL (temperature of the solution being 25±3° C.) (FIG. 4(d)). The diluted solution was analyzed using an atomic absorption spectrometer (AAS) at a temperature of 25±3° C. in order to calculate the amount of attachment of Cr. The average of values measured three times was taken as the amount of attachment of Cr.

After Rp, the peak density, and the amount of attachment of Cr were measured, as described above, a binding coefficient was calculated according to Mathematical Expression 1.

Texture Coefficient (TC)

The x-ray diffraction pattern of each of the manufactured electrolytic copper foil samples was calculated within a range of diffraction angles from 30° to 95°, and a ratio of the normalized peak strength of the (220) plane to the average peak strength of the (111), (200), (220), and (311) planes normalized as the peak strength of standard Cu was calculated as the texture coefficient of the (220) plane.

Yield Strength

The yield strength of each sample was measured using a universal testing machine (UTM) according to methods defined in the IPC-TM-650 Test Method Manual. The width of each sample for measurement was 12.7 mm, the distance between grips was 50 mm, and the measurement speed was 50 mm/min. For evaluation, the yield strength of each sample was repeatedly measured three times, and the average thereof was taken as the yield strength.

Occurrence of Wrinkles

Whether each electrolytic copper foil was folded in a roll-to-roll process was observed with the naked eye.

Manufacture of Negative Electrode

Current collectors each having a width of 10 cm were prepared using the electrolytic copper foils manufactured according to Examples and Comparative Examples 1 to 5. 2 parts by weight of styrene-butadiene rubber (SBR) and 2 parts by weight of carboxymethyl cellulose (CMC) were mixed with 100 parts by weight of $SiO_2$ and artificial graphite commercially available for a negative electrode active material on a current collector in distilled water, as a solvent, in order to manufacture a slurry.

Subsequently, an electrolytic copper foil sample to be measured was placed on a glass plate having a clean surface such that the electrolytic copper foil sample was not wrinkled or crumpled, and the copper foil was coated with a negative electrode material using a bar coater disposed above the copper foil such that the loading amount of the negative electrode material was 9.0±0.5 mg/cm². At this time, the speed of the bar coater was 10 to 15 mm/s. The copper foil sample coated with the negative electrode material was dried in a drying oven heated at 100° C. for 15 minutes, and the dried copper foil sample was pressed in four stages using a roll press such that the density of an electrode was 1.55±0.05 g/cc to manufacture a negative electrode. Adhesion force of the manufactured negative electrode was measured using the following method.

The manufactured electrode was cut to a width of 10 mm and a length of 100 mm, and an active material portion of the cut electrode and a reinforcement plate were adhered to each other using a double-sided tape. At this time, all samples were manufactured such that the attachment could be performed with uniform force. Adhesion force of the manufactured samples was measured using a UTM. At this time, the measurement conditions were as follows.
 Crosshead speed: 50.0 mm/min
 Measurement length: 20 to 50 mm
 90° peeling test Manufacture of Li Secondary Battery $LiPF_6$, as a solute, was dissolved in a non-aqueous organic solvent obtained by mixing ethylene carbonate (EC) and ethyl methyl carbonate (EMC) with each other at a ratio of 1:2 so as to have a concentration of 1M in order to manufacture a basic electrolytic solution, and 99.5 wt % of the basic electrolytic solution and 0.5 wt % of succinic anhydride were mixed with each other in order to manufacture a non-aqueous electrolytic solution.

A lithium manganese oxide, $Li_{1.1}Mn_{1.85}Al_{0.05}O_4$, and a lithium manganese oxide having an orthorhombic crystal structure, o-$LiMnO_2$, were mixed with each other in a weight ratio of 90:10 in order to manufacture a positive electrode active material. The positive electrode active material, carbon black, and polyvinylidene fluoride (PVDF), as a binder, were mixed with each other in a weight ratio of 85:10:5, and the same was mixed with NMP, as an organic solvent, in order to manufacture a slurry. The slurry thus manufactured was applied to opposite surfaces of an aluminum foil (Al foil) having a thickness of 20 μm and was then dried in order to manufacture a positive electrode.

An Li secondary battery cell was manufactured using the manufactured positive electrode, negative electrode, and electrolytic solution.

Table 2 below shows the binding coefficients of some of the electrolytic copper foil samples manufactured according to Examples of the present disclosure and the results of measurement of adhesion force thereof after coating with the negative electrode material.

TABLE 2

| | TC (g/L) | $Co^{2+}$ (g/L) | Rp (μm) | PD | Amount of attachment of Cr (mg/m²) | Binding coefficient (BC) | Adhesion force (N/m) |
|---|---|---|---|---|---|---|---|
| Example 1 | 0.05 | 0.32 | 0.6 | 10.0 | 0.6 | 1.5 | 28.8 |
| Example 2 | 0.11 | 0.16 | 1.8 | 110.0 | 3.9 | 9.4 | 29.5 |
| Example 3 | 0.05 | 0.16 | 0.9 | 75.0 | 1.8 | 5.2 | 29.7 |
| Example 4 | 0.05 | 0.16 | 0.9 | 75.0 | 1.8 | 5.2 | 31.2 |
| Example 5 | 0.05 | 0.16 | 0.9 | 75.0 | 1.8 | 5.2 | 25.4 |
| Comparative Example 1 | 0.05 | 0.34 | 0.5 | 9.0 | 0.5 | 1.3 | 18.5 |
| Comparative Example 2 | 0.13 | 0.16 | 1.9 | 111.0 | 4.0 | 9.6 | 20.1 |
| Comparative Example 3 | 0.05 | 0.16 | 0.9 | 75.0 | 1.8 | 5.2 | 18.8 |
| Comparative Example 4 | 0.05 | 0.16 | 0.9 | 75.0 | 1.8 | 5.2 | 19.5 |
| Comparative Example 5 | 0.05 | 0.16 | 0.9 | 75.0 | 1.8 | 5.2 | 19.8 |

Referring to Table 2, in the case of Examples 1 to 5, the binding coefficient is between 1.5 to 9.4, and in this case, the adhesion force is higher than 25 N/m. In the case of Comparative Examples 1 and 2, however, the binding coefficient deviates from a binding coefficient range (1.5 to 9.4), and in this case, the adhesion force is about 20 N/m or less, which is low. In the case in which the adhesion force is low as in Comparative Examples 1 and 2, a negative electrode material does not withstand stress generated due to expansion and shrinkage thereof and is separated from a copper foil during a charging and discharging process of an Li secondary battery after being manufactured, and the capacity of the secondary battery is considerably reduced due to such separation. Therefore, the binding coefficient of the electrolytic copper foil preferably has a value of 1.5 to 9.4.

Meanwhile, Comparative Examples 3 to 5 are identical to Examples 3 to 5 in terms of TC content, $Co^{2+}$ concentration, and anti-corrosion condition, and are different therefrom in terms of DETA content and deviation in flow speed. Foil making conditions of Examples and Comparative Examples and measurement values of samples manufactured under the conditions are shown in Table 3.

TABLE 3

|  | DETA (mg/L) | Lateral deviation in flow speed (%) | Binding coefficient (BC) | Texture coefficient of (200) plane | Weight deviation (%) | Yield strength (kgf/mm²) | Adhesion force (N/m) | Wrinkles |
|---|---|---|---|---|---|---|---|---|
| Example 1 | 7.5 | 5.2 | 1.5 | 0.89 | 1.5 | 35 | 28.8 | No wrinkles |
| Example 2 | 7.5 | 5.3 | 9.4 | 0.89 | 1.5 | 35 | 29.5 | No wrinkles |
| Example 3 | 3.2 | 4.8 | 5.2 | 0.49 | 1.5 | 22 | 29.7 | No wrinkles |
| Example 4 | 12 | 5.5 | 5.2 | 1.28 | 1.5 | 49 | 31.2 | No wrinkles |
| Example 5 | 7.5 | 9.8 | 5.2 | 0.89 | 3 | 35 | 25.4 | No wrinkles |
| Comparative Example 1 | 7.7 | 4.8 | 1.3 | 0.89 | 1.5 | 35 | 18.5 | No wrinkles |
| Comparative Example 2 | 7.5 | 5.0 | 9.6 | 0.89 | 1.5 | 35 | 20.1 | No wrinkles |
| Comparative Example 3 | 2.9 | 5.2 | 5.2 | 0.48 | 1.5 | 20 | 18.8 | Wrinkles |
| Comparative Example 4 | 12.1 | 5.3 | 5.2 | 1.3 | 1.5 | 51 | 19.5 | Wrinkles |
| Comparative Example 5 | 7.5 | 11.2 | 5.2 | 0.89 | 3.2 | 35 | 19.8 | No wrinkles |

First, Examples 3 to 5 and Comparative Examples 3 to 5 have the same binding coefficient. However, it can be seen that Comparative Examples 3 and 4 have texture coefficients that deviate from a texture coefficient range (0.49 to 1.28) of Examples 3 to 5 and have adhesion force values of less than 20. In the present disclosure, therefore, it can be seen that the texture coefficient is preferably within a range of 0.49 to 1.28.

Meanwhile, Comparative Example 5 has a texture coefficient of 0.89, which is within the texture coefficient range of Examples 3 to 5, but has a somewhat high weight deviation value and a low adhesion force value. That is, it can be presumed that low adhesion force indicated by the sample of Comparative Example 5 is caused by partial separation.

The above description has been made merely to illustrate the technical idea of the present disclosure, and those skilled in the art will appreciate that various variations and modifications are possible without departing from the intrinsic features of the present disclosure. Therefore, the embodiments disclosed in the present disclosure are provided to describe the technical idea of the present disclosure, rather than to limit the technical idea of the present disclosure, and the scope of the present disclosure is not limited by the embodiments. The scope of protection of the present disclosure should be determined by the appended claims, and all technical ideas within the range equivalent to the appended claims should be understood as falling within the scope of rights of the present disclosure.

The invention claimed is:

1. An electrolytic copper foil having a first surface and a second surface, the electrolytic copper foil comprising:
   a first protective layer at the first surface;
   a second protective layer at the second surface; and
   a copper film disposed between the first and second protective layers, wherein
   a binding coefficient of the electrolytic copper foil at the first surface or the second surface, defined as Mathematical Expression 1 below, is 1.5 to 9.4,
   (Mathematical Expression 1)
Binding coefficient=Rp/μm+ peak density/30+ amount of attachment of Cr/(mg/m²)
   (wherein the Rp (μm) is a peak height measured according to JIS B 0601 (2001) standard, wherein the peak density is a number of peaks per unit length of 4 mm, wherein the peak density is measured according to ASME B46.1 (2009) standard with a peak count level of ±0.5 μm and wherein the amount of attachment of Cr (mg/m²) is measured by dissolving the first surface or the second surface of the electrolytic copper foil (110) with a nitric acid solution to obtain a dissolved solution, diluting the dissolved solution with water to obtain a diluted solution, and analyzing the diluted solution using an atomic absorption spectrometer).

2. The electrolytic copper foil according to claim 1, wherein an X-ray diffraction pattern of the copper film measured at the first surface or the second surface shows a texture coefficient of a (220) plane, defined by Mathematical Expression 2 below, of 0.49 to 1.28,
0.49 to 1.28, $$TC(220) = \frac{\frac{I(220)}{I_0(220)}}{\frac{1}{n}\sum \frac{I(hkl)}{I_0(hkl)}}$$ (Mathematical Expression 2)

wherein TC(220) is the texture coefficient of the (220) plane, wherein I(hkl) is XRD diffraction strength of (hkl) crystal plane of the electrolytic copper foil, $I_0$(hkl) is XRD diffraction strength of (hkl) crystal plane of standard copper powder prescribed by Joint Committee on Power Diffraction Standards (JCPDS), wherein n is a number of diffraction peaks within 30° to 95° of diffraction angles (2 θ), and wherein the (hkl) crystal plane includes (111), (200), (220), and (311) crystal planes.

3. The electrolytic copper foil according to claim 1, wherein a weight deviation in lateral direction of the electrolytic copper foil is less than 3%.

4. The electrolytic copper foil according to claim 1, wherein the electrolytic copper foil has a yield strength of 21 to 49 kgf/mm2 measured at a normal temperature.

5. A method of manufacturing an electrolytic copper foil, the method comprising:
   electroplating a copper film on a rotary negative electrode drum by applying current between a positive electrode plate and the rotary negative electrode drum disposed in an electrolytic solution contained in an electrolytic bath so as to be spaced apart from each other;
   winding the electroplated copper film; and immersing the copper film in an anti-corrosion solution for anti-corrosion treatment, wherein, when the electroplating is performed, a concentration of total carbon is maintained at 0.12 g/L or less and a concentration of $Co^{2\pm}$ is maintained at 0.33 g/L or less.

6. The method according to claim 5, wherein a concentration of a nitrogen compound in the electrolytic solution is 3 to 12 ppm.

7. The method according to claim 6, wherein
the nitrogen compound comprises DETA, and
a concentration of the DETA is 3.2 to 12 mg/L.

8. The electrolytic copper foil according to claim 1, further comprising:

negative electrode active material layers on the first surface and the second surface.

* * * * *

UNITED STATES PATENT AND TRADEMARK OFFICE
CERTIFICATE OF CORRECTION

PATENT NO. : 11,346,014 B2
APPLICATION NO. : 16/643758
DATED : May 31, 2022
INVENTOR(S) : Seung Min Kim et al.

It is certified that error appears in the above-identified patent and that said Letters Patent is hereby corrected as shown below:

In the Specification

At Column 5, starting at Line 6, please replace the paragraph as follows:
In addition, the amount of attachment of Cr in Mathematical Expression 1 may be measured as follows. The surface opposite to the surface of an electrolytic copper foil to be measured is masked with tape, a sample is cut to a size of 100 mm*100 mm, the surface of the sample to be measured is dissolved in a nitric acid solution (commercial nitric acid and water being mixed at a ratio of 1:1 and the temperature of the nitric acid solution being 70° C.) such that no hole is formed through the copper foil by the nitric acid, and the dissolved solution is diluted with water until the amount of the dissolved solution is 50 mL (temperature of the solution being 25±3° C.). The diluted solution is analyzed using an atomic absorption spectrometer (AAS) at a temperature of 25±3° C. The opposite surface may be analyzed using the same method. The average of values measured three times is taken as the amount of attachment of Cr.

Signed and Sealed this
Twenty-first Day of May, 2024

Katherine Kelly Vidal
*Director of the United States Patent and Trademark Office*